March 6, 1962 — K. TEDISCH — 3,023,975

DEVICE FOR QUICK STOPPING OF RECORDER TAPE IN MAGNETIC RECORDERS

Filed June 30, 1959 — 3 Sheets-Sheet 1

INVENTOR
Karl Tedisch
BY
Frank R. Trifari
AGENT

March 6, 1962 K. TEDISCH 3,023,975

DEVICE FOR QUICK STOPPING OF RECORDER TAPE IN MAGNETIC RECORDERS

Filed June 30, 1959 3 Sheets-Sheet 2

INVENTOR
Karl Tedisch
BY
Frank R. Jifani
AGENT

INVENTOR
Karl Tedisch
BY
Frank R. Jifani
AGENT 3,023,975
Patented Mar. 6, 1962

3,023,975
DEVICE FOR QUICK STOPPING OF RECORDER TAPE IN MAGNETIC RECORDERS

Karl Tedisch, Eichgraben, Ottenheim, Austria, assignor to North American Philips Company, Inc., New York, N.Y., a corporation of Delaware Filed June 30, 1959, Ser. No. 824,121
Claims priority, application Austria July 9, 1958
6 Claims. (Cl. 242—55.12)

Figure 1:
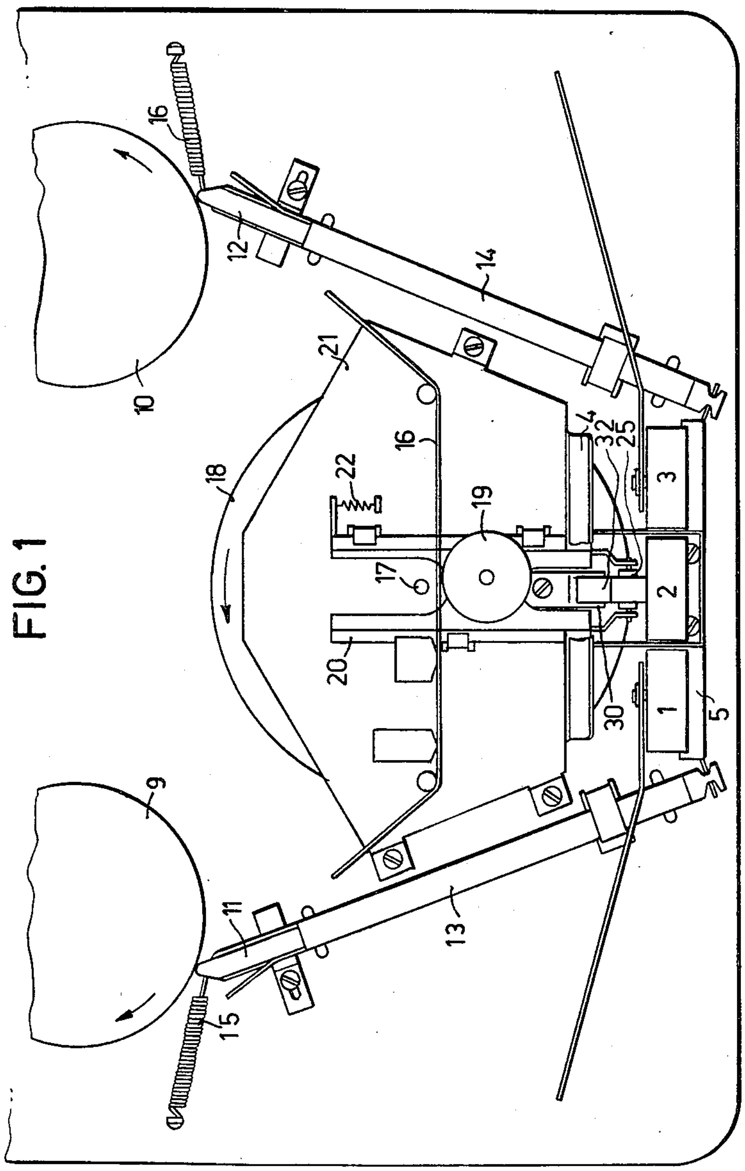
Figure 2:
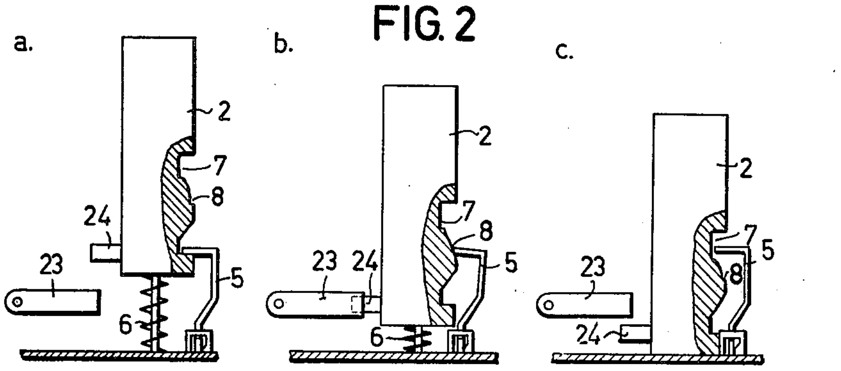

This invention relates to devices used in magnetic recorders for quickly stopping the recorder tape moved by the driving shaft and the pressure roller, the pressure roller being displaceable by means of an operating member so that the coupling between the driving shaft and the pressure roller may be established and eliminated, respectively.

For several purposes, for example when magnetic recorders are used for dictating purposes and the like, it is desirable during recording or reproduction that the tape can be stopped immediately for a certain period, which is usually short, while after this period the tape must immediately continue its movement in the original manner. The circuits required therefor may fundamentally be equipped with the operating members present in themselves. However, this is complicated and also makes it hardly possible for the tape to stop exactly at a desired position. Consequently, particular devices have been provided which are indicated as quick-stop devices. Said device requires an operating member of its own which usually has the form of a key (quick-stop key). In order to switch the tape on or off in a recorder in which the driving shaft is running continuously, it is sufficient per se to establish or eliminate the coupling between the tape and the driving shaft, and hence between the pressure roller and the driving shaft, without the operating position of the magnetic recorder having to be changed. In order to avoid continued movement of the tape due to inertia of its mass, upon disengagement lifting of the pressure roller from the driving shaft requires braking of the tape or of the carriers for the tape at the same time.

Quick-stop devices are known in numerous variants. However, such devices require the use of additional component parts and space for accommodating them. The quick-stop key required for the operation thereof increases the number of members to be operated, resulting in the device and its operation becoming more complicated and less surveyable.

With respect to these disadvantages, the present invention solves the problem of providing a quick-stop device which dispenses with an additional operating member and substantially without additional component parts. The device thus becomes extremely simple, surveyable and easy to operate.

According to the invention, the operating member determining the position of the pressure roller can be temporarily moved beyond its operating position in which the driving shaft is coupled to the pressure roller, into a press-through position in which the drive is uncoupled whereafter it automatically returns to the operating position, the direction of movement of the pressure roller being reversed as the operating member is returned. The operating member for displacing the pressure roller including the reversal of its direction of movement is preferably provided by a cam or profiled surface or the like. The profiled surface is preferably the surface of a plate, one end of which is secured to a displaceable operating member and situated with an axis of rotation or bending transverse of the direction of movement of the operating member. The free end of the plate being urged away from the operating member due to spring action. A fixed abutment is provided to pivot the plate and along which the bent portion of the plate can slide during the displacement of the operating member beyond the operating position. The plate is preferably a spring plate, one end of which is secured to the operating member. It is advantageous if, at the same time as the coupling between the driving shaft and the pressure roller is eliminated or opened, either the tape itself is braked or the carriers for the tape, for example the spooltables are braked by the operating member.

In order that the invention may be readily carried into effect, several embodiments will now be described in detail, by way of example, with reference to the accompanying drawings.

The magnetic recorder shown in the figures is based upon a device in which the spooltables for the supply-spool and the delivery spool are continuously driven by slip couplings in opposite senses. On the one hand, sufficient tension in the tape is thus ensured and, on the other hand, recoiling of the tape may be effected in a simple manner by making one slip coupling or the other rigid at will. FIG. 1 is a plan view of the complete device in which all the details not directly relating to the invention have been omitted. FIGS. 2, 3, 4 and 5 show further different embodiments of the quick stop device according to the invention in side view and in part sectional view, respectively.

In the magnetic recorder shown in FIG. 1, a push button aggregate comprising three buttons 1, 2 and 3 and a release lever 4 is provided for switching in the three possibilities for driving the tape, that is to say normal movement in the forward direction and fast movement in the forward and backward directions. The push buttons co-act in the operating position in known manner with a ratchet or latching member 5 which is common to all the keys (compare also FIGS. 2 to 5). A depressed key is released by depressing another key or release lever 4. The keys are restored or slide forward from the depressed or operating position to the rest position by means of spring force 6. The cuts provided on the keys are such as to enable the keys to be pressed through or past their operating position, the position of ratchet 5 in the pressed-through position being different from that in the operating position. In the case of key 2, which serves to switch on the normal forward movement, the cut is such that ratchet 5 in the pressed-through position occupies the same position as in the operating position of the key. This may be seen from FIGS. 2 to 5, all of which relate to the key 2. The figures indicated by *a* show the key in the rest position, the figures indicated by *b* show the key in the operating position and the figures indicated by *c* show the key in the press-through position. The keys 1 and 3, by means of which the fast forward and backward movements are switched on, are distinguished from key 2 only in that the cut 7 is eliminated or is filled up to the depth of the cut 8 seen in the drawings. The mechanism by means of which the spooltables 9 and 10 are driven from the electric motor via slip couplings, together with the means necessary for converting the slip couplings into rigid couplings, are not shown. For the spooltables 9 and 10 there are provided brakes 11 and 12 which are coupled to the ratchet 5 via pull rods 13 and 14, which are subject to the action of pull springs 15, 16, so that the spooltables 9 and 10 are braked when the keys 1, 2, 3 and release lever 4 and hence also the ratchet 5 are in their rest positions. As soon as one of the keys has been brought into the operating position, the ratchet 5 is turned away through a certain distance and the brakes are thus uncoupled. When the key 2 is pressed through the brakes are made operative again.

For recording and reproduction, the tape 16 is set into movement by a driving shaft 17 which is provided with a flywheel 18 and continuously driven by an electric motor (not shown). However, the tape 16 is not moved until a pressure roller 19 which is not driven apart from the tape, is coupled to the driving shaft 17.

The pressure roller 19 is arranged on a slide 20 which is journalled to be slidable on a chassis 21. A spring 22 provides for pressure roller 19 to remain out of engagement with driving shaft 17 in the rest-position of slide 20.

According to the invention, the device is designed so that the key 2 not only establishes the coupling between driving shaft 17 and pressure roller 19 as soon as this key is in its operating position, but when the key 2 is pressed-through also eliminates this coupling so long as the key 2 is maintained in the pressed-through position. As previously explained the brakes of the spooltables are made operative again in the pressed-through position of the key. The key for switching in the normal forward movement thus also fulfills the function of the quick-stop key.

Figure 5:
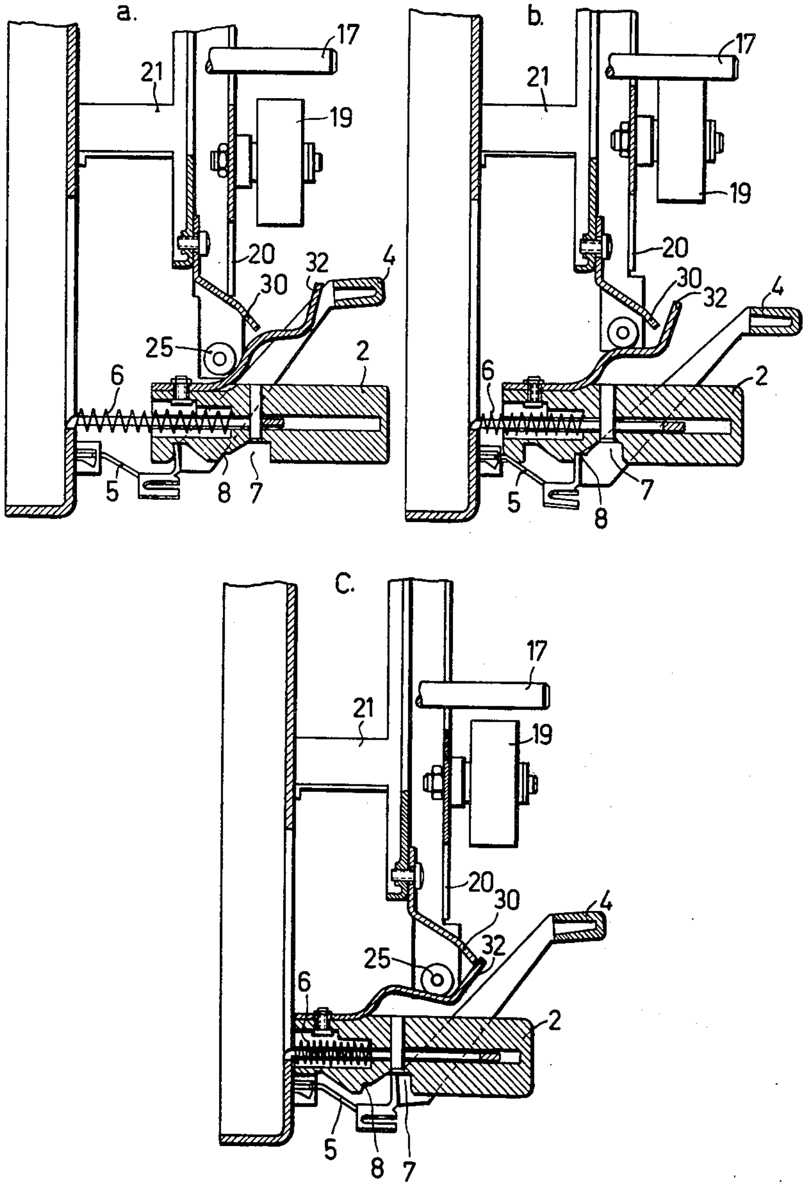

In order not to overload the drawings, the driving shaft 17 and the slide 20 together with the pressure roller 19 are shown only in FIG. 5. The embodiment shown in FIG. 2 relates to a device in which the slide 20 is displaced by electro-magnetic means. In the simplest case, a magnet can attract slide 20 against the action of a spring 22, thus coupling the driving shaft 17 to the pressure roller 19. The circuit of this magnet includes a pair of contacts 23 which in the rest-position of the key 2 (FIG. 2*b*) are closed by means of a knife-shaped contact piece 24 provided on the body of the key 2 which is made of insulating material. In the operating position of the key (FIG. 2*a*) and in the pressed-through position (FIG. 2*c*), the circuit is open, so that the magnet conveys no current and the slide 20 occupies the position shown in FIG. 1 by the action of spring 22.

Figure 3:
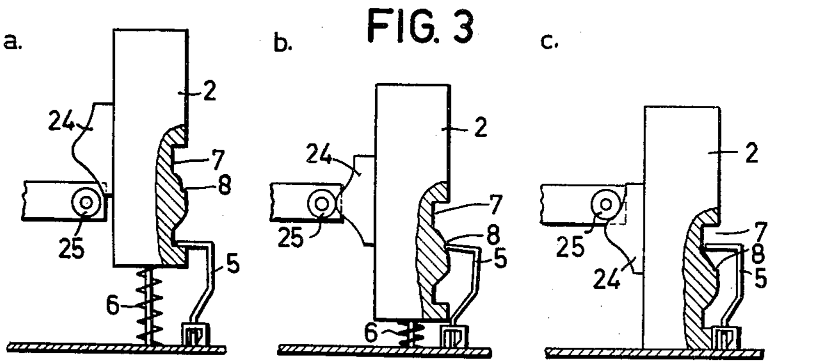

In the embodiment shown in FIG. 3, the slide 20 is displaced with the aid of a slide surface 24 provided on the key. The slide is maintained in contact with surface 24 via a roller 25. The slide surface 24 is such that the direction of movement of the slide is reversed as soon as the key is pressed-through beyond its rest-position (FIGS. 3*b* and 3*c*). The pressure roller 19 engages the driving shaft 17 with a pressure which is made independent of surface 24 preferably by means of resilient journalling of the pressure roller 19 on the slide 20.

Figure 4:
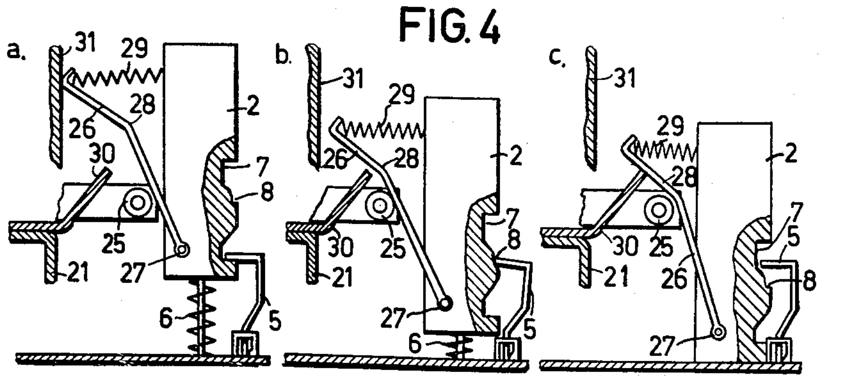

In the device shown in FIG. 4, a plate 26 is secured to the key by means of a shaft 27 which extends transversely of the direction of movement of the key 2. Its surface constitutes the slide surface for the roller 25. Its free end 28 is angularly bent away from the key and pushed away from it by means of a compression spring 29. With respect to the plate 26, a fixed stop 30 is secured to the chassis 21. A stop 31 restricts the action of spring 29. When the key 2 is pushed out of its operating position, the slide 20 is pushed forwards via the roller 25 while the spring 29 expands. It causes no difficulties to choose the proportioning to be such that, when the switched position of key 2 is reached, the driving shaft 17 and the pressure roller 19 engage with the desired pressure. When the key 2 is pressed-through, the plate 28 comes into contact with the stop 30, thus being pushed back towards the key so that the slide 20 returns by the action of spring 22 and the coupling between driving shaft 17 and pressure roller 19 is eliminated.

In the device shown in FIG. 5, a springplate 32 takes over the functions of the plate 28 and the spring 29. This device substantially does not require the use of any additional structural parts.

What is claimed is:

1. In a magnetic tape recording apparatus; means for moving the tape including a driving roller; a movable pressing member having an operative position in which it presses the tape against said roller and an inoperative position; and a mechanism for controlling the movement of the tape including an operating member having a rest position in which the tape is stationary, a press-through position in which the tape is temporarily stationary, and an operating position intermediate said first two positions in which the tape moves, means actuated by said operating member to move said pressing member into its inoperative position when the operating member is moved into its rest and press-through positions and to move said pressing member into its operative position when said operating member is moved into its intermediate position, means to normally hold said operating member in its intermediate position, and means to permit the operating member to return automatically from its press-through position to its intermediate position.

2. In a magnetic tape recording apparatus; means for moving the tape including a driving roller; a movable pressing member having an operative position in which it presses the tape against said roller and an inoperative position; and a mechanism for controlling the movement of the tape including braking means movable into an operating position to stop the movement of said tape; an operating member having a rest position in which the tape is stationary, a press-through position in which the tape is temporarily stationary, and an operating position intermediate said first two positions in which the tape moves, means actuated by said operating member to move said pressing member into its inoperative position when the operating member is moved into its rest and press-through positions and to move said pressing member into its operative position when said operating member is moved into its intermediate position, means to normally hold said operating member in its intermediate position, means to permit the operating member to return automatically from its press-through position to its intermediate position, and means actuated by said operating member to move said braking means into the operating position when the operating member is moved into its rest and press-through positions.

3. In a magnetic tape recording apparatus; means for moving the tape including a driving roller; a movable pressing member having an operative position in which it presses the tape against said roller and an inoperative position; and a mechanism for controlling the movement of the tape including an operating member having a rest position in which the tape is stationary, a press-through position in which the tape is held stationary temporarily, and an operating position intermediate said first two positions in which the tape moves, means actuated by said operating member including a cam-like member having a profiled surface to move said pressing member into its inoperative position when the operating member is moved into its rest and press-through positions and to move said pressing member into its operative position when said operating member is moved into its intermediate position, means to normally hold said operating member in its intermediate position, and means to return the operating member automatically from its press-through position to its intermediate position when said operating member is inoperative.

4. In a magnetic tape recording apparatus; means for moving the tape including a driving roller; a movable pressing roller having an operative position in which it presses the tape against said driving roller and an inoperative position; and a mechanism for controlling the movement of the tape including a push button having a rest position at which the tape is stationary, a press-through position in which the tape is held stationary for short periods, and an operating position intermediate said first two positions in which the tape moves, means actuated by said push button to move said pressing roller into its inoperative position when the operating member is moved into its rest and press-through positions and to move said pressing roller into its operative position when said operating member is moved into its intermediate position, said latter means including a cam-like member having a profiled surface, means to normally hold said operating member in its intermediate position, and resilient means to return said push button from its press-through position to its intermediate position when the push button is released.

5. In a magnetic tape recording apparatus; means for moving the tape including a driving roller; a movable pressing roller having an operative position in which it presses the tape against said roller and an inoperative position; and a mechanism for controlling the movement of the tape including an operating member having a rest position in which the tape is stationary, a press-through position in which the tape is temporarily stationary, and an operating position intermediate said first two positions in which the tape moves, means associated with said operating member to place said pressing roller in its inoperative position when the operating member is in its rest and press-through positions and to place said pressing roller in its operative position when said operating member is in its intermediate position, said latter means including a bent lever pivotedly mounted on said operating member, a stationary stop arranged to contact said lever when said operating member is in its press-through position, a resilient member urging said lever toward said stop and a member connected to said pressing roller and actuated by said lever, means to normally hold said operating member in its intermediate position, and means to return the operating member from its press-through position to its intermediate position when the operating member is released.

6. In a magnetic tape recording apparatus; means for moving the tape including a driving roller; a movable pressing roller having an operative position in which it presses the tape against the roller and an inoperative position; and a mechanism for controlling the movement of the tape including a push button slidably mounted and having a rest position in which the tape is stationary, a press-through position in which the tape is temporarily stationary, and an operating position intermediate said first two positions in which the tape moves, a cam-like member actuated by said push button to place said pressing roller in its inoperative position when the push button is in its rest and press-through positions and to place said pressing roller in its operative position when said push button is in its intermediate position, a cam associated with said push button, a ratchet member mounted to engage and normally hold said cam when the push button is in its intermediate position, a spring to automatically return the push button from its press-through position to its intermediate position, and means to release said ratchet member and permit said spring to return the push button to its rest position.

References Cited in the file of this patent

UNITED STATES PATENTS

| | | |
|---|---|---|
| 2,782,263 | Hoehn et al. | Feb. 19, 1957 |
| 2,793,039 | Hironimus | May 21, 1957 |